(12) United States Patent
Jiang et al.

(10) Patent No.: US 9,690,617 B2
(45) Date of Patent: Jun. 27, 2017

(54) ADJUSTMENT OF A TASK EXECUTION PLAN AT RUNTIME

(71) Applicant: International Business Machines Corporation, Armonk, NY (US)

(72) Inventors: Jun Jie J. Jiang, Beijing (CN); Xin Pei Lang, Beijing (CN); Liu Xin Peng, Tiantongyuan (CN); Jin Liang Shi, Beijing (CN); Xiao Ji Tian, Beijing (CN); Xiu Cheng Wu, Beijing (CN); Jun Hong Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 13/766,083

(22) Filed: Feb. 13, 2013

(65) Prior Publication Data
US 2013/0290968 A1 Oct. 31, 2013

(30) Foreign Application Priority Data

Apr. 28, 2012 (CN) .......................... 2012 1 0133844

(51) Int. Cl.
*G06F 9/46* (2006.01)
*G06F 9/48* (2006.01)
*G06Q 10/06* (2012.01)

(52) U.S. Cl.
CPC .......... *G06F 9/4843* (2013.01); *G06Q 10/06* (2013.01)

(58) Field of Classification Search
CPC .................................................. G06F 9/4881
(Continued)

(56) References Cited

U.S. PATENT DOCUMENTS 7,631,291 B2 12/2009 Shukla et al.
7,885,847 B2 2/2011 Wodtke et al.
(Continued)

FOREIGN PATENT DOCUMENTS

CN 101169738 A 4/2008
CN 101510163 A 8/2009

OTHER PUBLICATIONS

Halliday, et al, "Flexible Workflow Management in the Openflow System"; Proceedings of the Fifth IEEE International Enterprise Distributed Object Computing Conference, 2001, 17 pages.
(Continued)

*Primary Examiner* — Emerson Puente
*Assistant Examiner* — Steven Do
(74) *Attorney, Agent, or Firm* — Janaki K. Davda; Konrad, Raynes, Davda & Victor LLP (57) ABSTRACT

Embodiments of adjustment of a task execution plan at runtime by a task execution engine configured to receive a plan compilation task, the plan compilation task comprising a task execution plan, are provided. An aspect includes receiving a first plan compilation task by the task execution engine through a plan compilation interface. Another aspect includes modifying a task execution plan of the first plan compilation task in response to receiving a second plan compilation task by the task execution engine, the second plan compilation task comprising a task execution plan for modifying the task execution plan of the first plan compilation task. Yet another aspect includes reading a next task in the task execution plan of the first plan compilation task and initiating the next task by the task execution engine.

20 Claims, 6 Drawing Sheets (58) Field of Classification Search
USPC .......................................................... 705/301
See application file for complete search history.

(56) References Cited

U.S. PATENT DOCUMENTS

| | | |
|---|---|---|
| 2001/0034558 A1 | 10/2001 | Hoskins |
| 2002/0188644 A1 | 12/2002 | Seidman |
| 2008/0046862 A1 | 2/2008 | Sattler et al. |
| 2009/0007123 A1 | 1/2009 | Sreedharan et al. |
| 2009/0150887 A1* | 6/2009 | Sanghvi et al. ............. 718/102 |
| 2009/0235252 A1* | 9/2009 | Weber ...................... G06F 8/10 718/100 |
| 2010/0131792 A1* | 5/2010 | Herrod ............................. 714/2 |
| 2011/0231822 A1* | 9/2011 | Sabin et al. ................. 717/124 |
| 2011/0264483 A1 | 10/2011 | Nezhad et al. |
| 2012/0137298 A1* | 5/2012 | Periorellis et al. ........... 718/102 |

OTHER PUBLICATIONS

Heer et al, "Workflows in Dynamic Development Processes", Business Process Management Workshops, Lecture Notes in Business Information Processing 17, pp. 266-267, 2009.

Xia, et al, "Context-Driven Business Process Adaptaion for Ad Hoc Changes", IEEE International Conference on e-Business Engineering, 2008, pp. 53-60.

English Abstract and Machine Translation for CN101169738A, published on Apr. 30, 2008, Total 8 pp.

English Abstract and Machine Translation for CN101510163A, published on Aug. 19, 2009, Total 7 pp.

Information Materials for IDS, Dec. 11, 2015, for CN920120048CN1 Office Action dated Dec. 3, 2015, Total 6 pp.

\* cited by examiner

```xml
<?xml version="1.0" encoding="utf-8" ?>
<!-- each task execution plan has a unique task-plan ID and state information; committed
indicates that the current task execution plan has been submitted -->
    <taskplan uuid="7E561726-6BB7-482C-B5EF-46AA5C78CC94" status=" committed " >
    <tasks>
    <task>
    <!-- each task execution plan has a type identifier; the same task execution plan may include
a plurality of tasks of the same type -->
    <tasktype> plan compilation task </tasktype>
    <!-- each task has a unique task ID -->
    <uuid>5CAA33FD-5572-475E-8C96-163E45518BF5</uuid>
    </task>
    <task>
    <tasktype> notification </tasktype>
    <uuid>298b2c4d-116c-cf5c-bd72-414382791846</uuid>
    <context>
    <input name="title" value=" notify students' parents "/>
    <input name="student_id" value="mike@xx.xx"/>
    ...
    </context>
    </task>
    <task>
    <tasktype> student online exercise </tasktype>
    <uuid>F1D1B89E-1E1E-4B0C-A81A-BC7BE76D77C8</uuid>
    <context>
    <input name="title" value=" Mike takes mathematic exercises online "/>
    <input name="timeline" value="1 month"/>
    <input name="resource_url" value="http://studentportal.com/exercise"/>
    ...
    </context>
    </task>
    <tasks>
    <routes>
    <!-- define relationships between tasks in the task execution plan; sourcetask and targettask
cite the task IDs defined in above mentioned tasks respectively -->
        <route sourcetask="5CAA33FD-5572-475E-8C96-163E45518BF5"
        targettask="298b2c4d-116c-cf5c-bd72-414382791846"/>
        <route sourcetask="298b2c4d-116c-cf5c-bd72-414382791846"
        targettask=" F1D1B89E-1E1E-4B0C-A81A-BC7BE76D77C8"/>
    </routes>
</taskplan>
```

Fig. 3

```xml
<?xml version="1.0" encoding="utf-8" ?>
    <!-- a task execution plan identifier indicates which task execution plan is to be modified
-->
    <!-- uncommitted indicates that the task execution plan will be changed, but the change has not been merged with the original task execution plan yet -->
    <taskplan uuid="7E561726-6BB7-482C-B5EF-46AA5C78CC94" status="uncommitted">
    <tasks>
    <!-- add a new task which is not included in the task execution plan in the first task compilation plan -->
    <task>
    <tasktype> expert consulting </tasktype>
    <uuid>E0F096C1-0F20-4A5F-AFE5-42EBFB59A086</uuid>
    <context>
    <input name="title" value=" consult a mathematic expert "/>
    <input name="specialist_id" value="tjohn@xx.xx"/>
    ...
    </context>
    </task>
    <tasks>
    <routes>
    <!-- insert expert consulting task between the notification task and student online exercise task -->
    <route sourcetask="298b2c4d-116c-cf5c-bd72-414382791846" targettask="E0F096C1-0F20-4A5F-AFE5-42EBFB59A086"/>
    <route sourcetask="E0F096C1-0F20-4A5F-AFE5-42EBFB59A086" targettask=" F1D1B89E-1E1E-4B0C-A81A-BC7BE76D77C8"/>
    </routes>
</taskplan>
```

Fig. 4

```xml
<?xml version="1.0" encoding="utf-8" ?>
    <!-- only those with a same task execution plan unique task-plan identifier can be merged,
and committed indicates that the latest task execution plan has been submitted -->
    <taskplan uuid="7E561726-6BB7-482C-B5EF-46AA5C78CC94" status=" committed " >
    <tasks>
    <task>
    <!-- each task execution plan has a type identifier; the same task execution plan may include
a plurality of tasks of the same type -->
    <tasktype> plan compilation task </tasktype>
    <!-- each task has a unique task ID -->
    <uuid>5CAA33FD-5572-475E-8C96-163E45518BF5</uuid>
    </task>
    <task>
    <tasktype> notification </tasktype>
    <uuid>298b2c4d-116c-cf5c-bd72-414382791846</uuid>
    <context>
    <input name="title" value=" notify the students and parents "/>
    <input name="student_id" value="mike@xx.xx"/>
    ...
    </context>
    </task>
    <task>
    <tasktype> student online exercise </tasktype>
    <uuid>F1D1B89E-1E1E-4B0C-A81A-BC7BE76D77C8</uuid>
    <context>
    <input name="title" value=" Mike takes mathematic exercises online "/>
    <input name="timeline" value="1 month"/>
    <input name="resource_url" value="http://studentportal.com/exercise"/>
    ...
    </context>
    </task>
    <task>
    <tasktype> expert consulting </tasktype>
    <uuid>E0F096C1-0F20-4A5F-AFE5-42EBFB59A086</uuid>
    <context>
    <input name="title" value=" consult a mathematic expert "/>
    <input name="specialist_id" value="tjohn@xx.xx"/>
    ...
    </context>
    </task>
    <tasks>
    <routes>
    <!-- define relationships between tasks in the task execution plan; sourcetask and targettask
cite the task IDs defined in above mentioned tasks respectively -->
    <route sourcetask="5CAA33FD-5572-475E-8C96-163E45518BF5"
targettask="298b2c4d-116c-cf5c-bd72-414382791846"/>
    <!-- insert expert consulting task between the notification task and student online exercise
task -->
    <route sourcetask="298b2c4d-116c-cf5c-bd72-414382791846"
targettask="E0F096C1-0F20-4A5F-AFE5-42EBFB59A086"/>
    <route sourcetask="E0F096C1-0F20-4A5F-AFE5-42EBFB59A086"
targettask=" F1D1B89E-1E1E-4B0C-A81A-BC7BE76D77C8"/>
    </routes>
</taskplan>
```

ADJUSTMENT OF A TASK EXECUTION PLAN AT RUNTIME

CROSS REFERENCE TO RELATED APPLICATION

This application claims the benefit of priority under 35 U.S.C. §119 to Chinese Patent Application No. 201210133844.4, filed on Apr. 28, 2012, which is herein incorporated by reference in its entirety.

BACKGROUND

This disclosure relates generally to management of service flow system, and more specifically, to adjustment of a task execution plan at runtime.

In a service flow system with the relatively complex service demands, it may be demanding to design and maintain the service flow system. A task-oriented design method may be used in a service flow system. A task is similar to a flow fragment, and may be simple and directly targeted. The task-oriented design system may reduce the complexity of a traditional service flow system and provide more flexibility during design and running of the service flow system.

Because a task is only a relatively small, simple portion of the whole service flow, a task cannot satisfy the entire demand on the service flow, and coordination between tasks is necessary. During implementation of some task execution engines, which may also be referred to as flow engines, coordination between tasks may be generally defined during the flow design procedure. A task may define an event type that is a precondition for the task. Another task may trigger the precondition event so that the task may be initiated. The relationship between an event-triggering task (also called a source task) and an event task (also called an objective task) must be defined during designing of the service flow system.

However, in a task execution engine, it may be difficult to dynamically adjust a task execution plan after the relationships have been defined. For example, in the education field, when some students are poor in a certain subject or desire for a further improvement, they have to get help on this subject. At this point, a teacher may formulate a study improvement plan according to the actual conditions of the students. This plan may include various tasks, for example, communicating with students' parents, discussing with subject experts, scheduling students' curriculum, mid-term testing, and evaluation on teachers. Because different plans may comprise different tasks, and the sequence between tasks may not be identical, and the tasks themselves may not be all defined in advance, it may be difficult to predict all possible combinations when designing a flow for the student improvement plan with a traditional task execution engine and design tools. Due to a relatively large number of task combinations, a designers or developers cannot impose too many restrictions and introduce significant complex control logics during designing, such that the traditional task execution engine and design tools cannot directly solve such a problem during the design procedure.

SUMMARY

Embodiments of methods, systems, and a computer program product for adjustment of a task execution plan at runtime by a task execution engine configured to receive a plan compilation task, the plan compilation task comprising a task execution plan, are provided. An aspect includes receiving a first plan compilation task by the task execution engine through a plan compilation interface. Another aspect includes modifying a task execution plan of the first plan compilation task in response to receiving a second plan compilation task by the task execution engine, the second plan compilation task comprising a task execution plan for modifying the task execution plan of the first plan compilation task. Yet another aspect includes reading a next task in the task execution plan of the first plan compilation task and initiating the next task by the task execution engine.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 3 illustrates an example of using extensible markup language (XML) to describe a task execution plan of a first plan compilation task for a task flow as involved in the Background;

FIG. 5 illustrates an example of using XML to describe a task execution plan of a modified first plan compilation task for a task flow as involved in the Background;

DETAILED DESCRIPTION

Embodiments of adjustment of a task execution plan at runtime are provided, with exemplary embodiments being discussed below in detail. It may be dynamically decided which tasks are added during running of a task execution engine, and coordination relationship between tasks as well as their coordination manners may also be modified. Adjustment of a task execution plan at runtime may be achieved by receiving a first plan compilation task by a task execution engine; receiving a second plan compilation task in response to the task execution plan of the first plan compilation task needing to be modified, and modifying the task execution plan of the first plan compilation task based on a task execution plan of the second plan compilation task; and reading a next task in the task execution plan of the first plan compilation task and initiating the next task.

Figure 1:
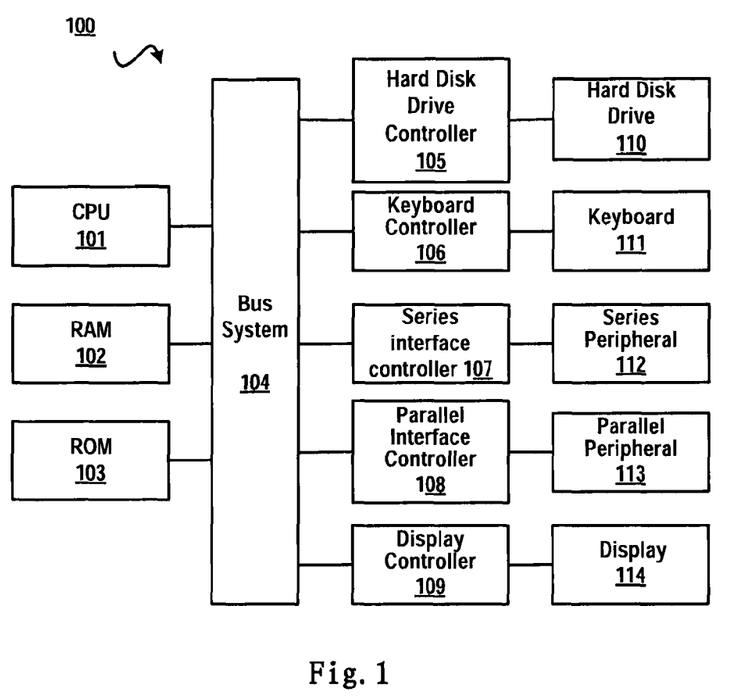
FIG. 1 illustrates a block diagram of an exemplary computing system 100 that is adapted to implement the embodiments of the present invention.

FIG. 1 shows an example of a computer system 100 for use with embodiments of adjustment of a task execution plan at runtime. As shown in FIG. 1, the computer system 100 includes: a central processing unit (CPU) 101, random access memory (RAM) 102, read only memory (ROM) 103, system bus 104, hard drive controller 105, keyboard controller 106, serial interface controller 107, parallel interface controller 108, display controller 109, hard drive 110, keyboard 111, serial peripheral equipment 112, parallel peripheral equipment 113 and display 114. Among above devices, CPU 101, RAM 102, ROM 103, hard drive controller 105, keyboard controller 106, serial interface controller 107, parallel interface controller 108 and display controller 109 are coupled to the system bus 104. Hard drive 110 is coupled to hard drive controller 105. Keyboard 111 is coupled to keyboard controller 106. Serial peripheral equipment 112 is coupled to Serial interface controller 107. Parallel peripheral equipment 113 is coupled to parallel interface controller 108. Display 114 is coupled to display controller 109. Computer system 100 as shown in FIG. 1 is shown for illustrative purposes only; in some embodiments, various devices may be added to or removed from the computer system 100.

Various embodiments of adjustment of a task execution plan at runtime are described below with reference to the accompanying drawings. However, the present disclosure may be implemented in any appropriate manner. Embodiments of adjustment of a task execution plan at runtime may be implemented as a system, method or computer program product. Some embodiments may take the form of an entirely hardware embodiment, or an embodiment combining software (including firmware, resident software, microcode, etc.) and hardware aspects that may all generally be referred to herein as a "circuit," "module" or "system."

Furthermore, some embodiments of adjustment of a task execution plan at runtime may take the form of a computer program product embodied in one or more computer readable medium(s) having computer readable program code embodied thereon. Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various embodiments of adjustment of a task execution plan at runtime are described below with reference to flowchart illustrations and/or block diagrams of methods, apparatus (systems) and computer program products according to embodiments of the invention. The blocks of the flowchart illustrations and/or block diagrams, and combinations of blocks in the flowchart illustrations and/or block diagrams, may be implemented by computer program instructions in some embodiments. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational blocks to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of adjustment of a task execution plan at runtime may be implemented in a task execution engine. A dedicated plan compilation task may receive a compilation request for a task execution plan, thereby forming a task execution plan at runtime that may be scheduled and executed by a task execution engine. During the entire execution process of the task execution plan, a plurality of plan compilation task instances may be generated as required, and each plan compilation task instance may become a part of a current task execution plan, such that when the plan compilation task instance is interpreted and executed by the task execution engine during the task execution plan, the plan compilation task is activated to generate a corresponding task execution plan and merged into the task execution plan at runtime. The process may be a continuously iterative optimization process, thereby modifying the initial task execution plan at runtime.

Figure 2:
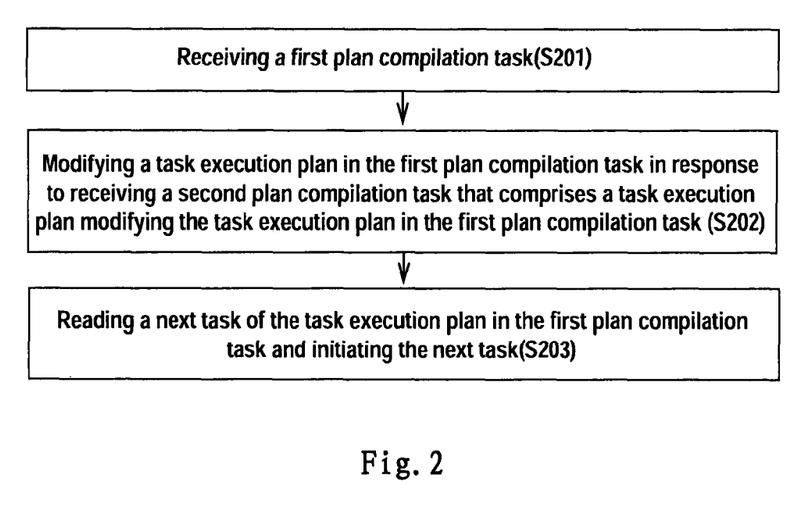
FIG. 2 illustrates a method flow of adjusting a task execution plan at runtime according to a preferred embodiment of the present invention.

FIG. 2 illustrates a flowchart of an embodiment of a method of adjustment of a task execution plan at runtime. The method of FIG. 2 may run in a task execution engine. The task execution engine receives a plan compilation task through a plan compilation interface. The plan compilation task is a task comprising a task execution plan, i.e., the plan compilation task is a compound task. First, in block S201 of FIG. 2, a first plan compilation task is received. Then, in block S202, in response to receiving a second plan compilation task that comprises a task execution plan for modifying the task execution plan of the first plan compilation task, the task execution plan of the first plan compilation task is modified according the second plan compilation task. Next, in block S203, a next task is read in the task execution plan of the first plan compilation task, and the next task is initiated after reading.

In the task execution engine, a metatask is a basic unit executed by the task execution engine. A task may be a metatask, a compound task (i.e., combination of metatasks), or a combination or nesting of metatask(s) and compound task(s). In the method of FIG. 2, a plan compilation task is a task that comprises a task execution plan. The task execution plan comprises the scope of all tasks, an execution sequence, and context information. The context information generally refers to the attributes shared by all tasks in the task execution plan and the attributes of a particular task, including, but not limited to the tasks' input data fields, output data fields, and intermediate data fields. All tasks may be defined by a programmer and registered in a task registration module for storage. The task registration module may be a module in the task execution engine or a storage system outside the task execution engine that is coupled to and communicate with the task execution engine. A registered task stored in the task registration module comprises metadata information of the task, the metadata information including, but not limited to, the task's type, name, input and output data fields, and other information. FIG. 3 illustrates an example of XML code describing a task execution plan of a first plan compilation task for a task flow, wherein routes indicate the execution sequence of each task, such as may be received by the task execution engine in block S201 of FIG. 2.

The task execution engine comprises a modification interface that activates an editing apparatus in response to an operation of a user or an external system, for example, a keyboard operation by a user, or an operation on a menu of the task execution engine through a mouse, or an interruption operation of an external system, and other various kinds of activation operations. The user or external system may use the editing apparatus to edit a task execution plan of the second plan compilation task that is received in block S202 of FIG. 2. The editing apparatus transmits the edited task execution plan of the second plan compilation task to the plan compilation interface of the task execution engine.

The task execution engine further comprises an editing interface that activates an editing apparatus in response to the task execution engine receiving a plan compilation task via the plan compilation interface for editing the task execution plan of the plan compilation task. For example, once the task execution engine receives the first plan compilation task, the plan compilation interface may activate an editing apparatus, and the user may use the editing apparatus to further edit the task execution plan of the plan compilation task. When receiving the second plan compilation task, the user may edit and modify a task execution plan of the second plan compilation task.

Figure 4:
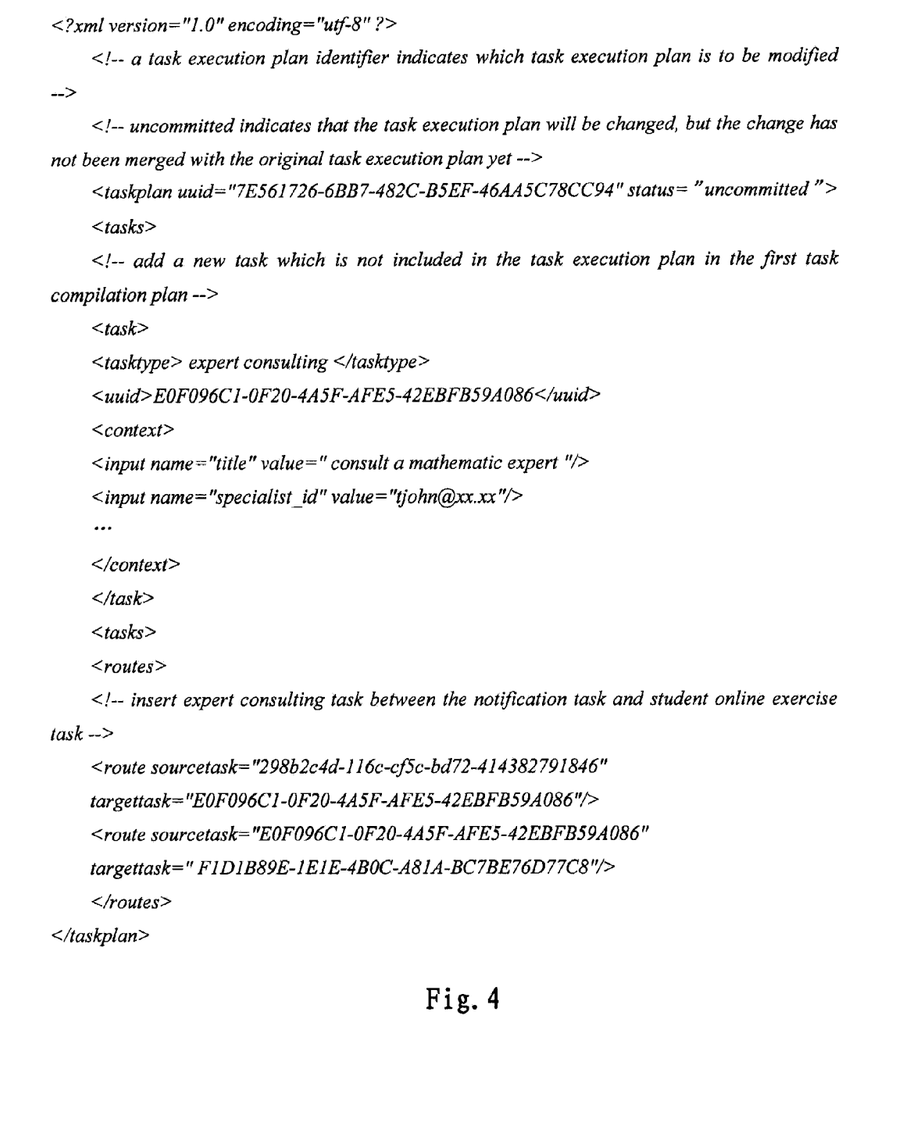
FIG. 4 illustrates an example of using XML to describe a task execution plan of a second plan compilation task for a task flow as involved in the Background.

Returning to the example in the education field that was discussed above, the teacher may suspend execution of the task execution plan of the first plan compilation task utilizing a modification interface and add a second compilation task, thereby modifying the task execution plan of the first plan compilation task. The second plan compilation task may also be directly received via the plan compilation interface. FIG. 4 illustrates an example of XML code describing a task execution plan of a second plan compilation task for a task flow. Modification performed by the task execution plan in the second plan compilation task to the task execution plan in the first plan compilation task may include, but is not limited to, adding a plurality of second plan compilation tasks to the task execution plan of the first plan compilation task; or a second plan compilation task may be added into the first plan compilation task, and a third plan compilation task is added into the second plan compilation task, so as to modify the task execution plan iteratively or in nesting manner. In the method of FIG. 2, the first plan compilation task may be regarded as a root plan compilation task into which a new plan compilation task may be added; however, the added plan compilation task cannot modify or delete an executed task.

The added plurality of second plan compilation tasks or nested plurality of second plan compilation tasks may modify the task execution plan of the first plan compilation task. Specifically, the added plurality of second plan compilation task or nested plurality of second plan compilation tasks comprise at least one of the following modifications to the task execution plan of the first plan compilation tasks: (1) adding at least one task to the task execution plan of the first plan compilation task; (2) deleting at least one task from the task execution plan of the first plan compilation task; (3) setting or changing execution sequence of the tasks in the task execution plan of the first plan compilation task; (4) setting or changing parallel execution of the tasks in the task execution plan of the first plan compilation task; and (5) setting or changing context information of a particular task in the task execution plan of the first plan compilation task. In this way, it is possible to continuously or iteratively change the task execution plan of the current first plan compilation task at runtime. The context information of a particular task includes the property information of the particular task, for example, the tasks' input data fields or output data fields.

The task execution engine may parse the task execution plan of the second plan compilation task and perform corresponding modification operations based on the task execution plan of FIG. 4, for example, adding an added task from FIG. 4 into the task execution plan of FIG. 3, or deleting a deleted task from FIG. 4 from the task execution plan of FIG. 3, thereby obtaining a modified task execution plan of the first plan compilation task. FIG. 5 illustrates an example of XML code that describes a task execution plan of a modified first plan compilation task for a task flow based on FIGS. 3 and 4.

The task execution plan may be modified as needed, and the execution is performed according to the modified task execution plan. In a task execution engine, a plurality of first plan compilation tasks, i.e., a plurality of task execution plans, may exist. Different unique task-plan identifiers (Ids) may be used to mark these different task execution plans, and the IDs maintain unchanged during the entire running period of the task execution plans. Each task execution plan may further comprise different tasks, and these different tasks may also be identified by unique task IDs. In each task execution engine, reading a next task of the task execution plan for the first task compilation task and initiating the next task may be performed by reading the unique task-plan ID of the task execution plan of the first plan compilation task. In this way, if the task execution plan of the first plan compilation task is modified, but the modified task execution plan still adopts the original unique task-plan ID, then the modified task execution plan may be read, thereby guaranteeing execution of the modified task execution plan. This is illustrated in FIG. 4 and FIG. 5.

However, if the plan is executed during the process of modifying the task execution plan, problems will arise. Thus, in some embodiments, for the task execution plan of the first plan compilation task, a lock may be used to control the reading operation for the task execution plan, wherein during the activation period of the modification interface or plan compilation interface, i.e., in response to activation of modification of the task execution plan of the first plan compilation task, the lock is imposed on the reading operation for the task execution plan of the first plan compilation task. At this point, the operation of the execution engine can only complete the execution of the currently being executed task, but cannot read a next task; thus, the task execution engine is in a waiting state until after the task execution engine modifies the task execution plan of the first plan compilation task in response to receiving the second plan compilation task that comprises a task execution plan of modifying the task execution plan of the first plan compilation task, i.e., in response to completion of modifying the task execution plan of the first plan compilation task, the reading operation of the task execution plan of the first task compilation task is unlocked. Only at this point may the execution engine continue reading the next task to and proceed with execution.

In other embodiments, a state query may also be employed. For example, when it is necessary to modify the task execution plan of the first plan compilation task, the state of the task execution plan is unavailable; after completion of modifying the task execution plan of the first plan compilation task, the state of the task execution plan is made available; if it is determined that the state of the task execution plan is unavailable when reading a next task in the task execution plan of the first plan compilation task, the reading will wait till the state of the task execution plan becomes available. In further embodiments a trigger may be suspended, wherein in response to a necessity of modifying the task execution plan of the first plan compilation task, the action of triggering of reading the next task in the task execution plan of the first plan compilation task is suspended. In response to completion of modifying the task execution plan of the first plan compilation task, the action of triggering reading the next task in the task execution plan of the first plan compilation task continues to be executed.

In one embodiment, the task execution engine may further validate the correctness of the task execution plan in the first plan compilation task. If the task execution plan in the first plan compilation task is validated to fail, the external system or user may be notified of the validation failure information, and then the input from the external system or user is received via the external interface, so as to determine whether to continue executing the first plan compilation task or re-input a new plan compilation task, or end the execution of the first plan compilation task.

After the correctness of the task execution plan is validated in the first plan compilation task, the first plan compilation task can be initiated in some embodiments; or the first plan compilation task may be directly initiated without validation in other embodiments. The initiated first plan compilation task may be used by the external system or user to determine the current task execution plan or to modify the current task execution in any appropriate manner; for example, by generating a work item.

In one embodiment, task execution engine may, in response to the task execution plan in the first plan compilation task being modified, validate the correctness of the modified task execution plan in the first plan compilation task. If the validation fails again, the external system or user may be notified of the validation failure information, and then the input from the external system or user is received via the external interface, so as to determine whether to continue executing the first plan compilation task or re-input a new plan compilation task, or end the execution of the first plan compilation task.

After the correctness of the task execution plan in the first plan compilation task is validated, the modified first plan compilation task can be initiated in some embodiments; or the modified first plan compilation task is directly initiated without validation in other embodiments. During modification of the current task execution plan, the first plan compilation task interacts with a task execution plan tracking, recording, storing, and accessing interface, so as to guarantee the compatibility of the change of the task execution plan with the task execution history, for example, obtaining the tasks that have been currently completed, obtaining a next task through a task execution plan, thereby starting execution of the modified task execution plan. An executed task may be changed in the task execution plan in some embodiments, or the executed task can be modified by adding a new task of the same type in other embodiments, and the input data items of the newly added tasks may be obtained from the already executed task output data items.

During the execution process of the task execution plan, after a next task of the task execution plan in the first plan compilation task is read and initiated in the task execution engine, the execution state of the next task and the context information of the execution can be tracked and recorded, wherein the task execution engine provides a task execution plan tracking, recording, storing, and accessing interface through which the external system or user may access the execution states of respective tasks in the current execution plan and the context information of the execution. The states of task execution may include whether the execution has been completed, whether a task is being executed and has not been executed yet, and context information of the task execution comprises the inputted parameters, outputted parameters, and parameter variations, during the task execution process.

In this way, a next task of the task execution plan in the first plan compilation task is read. Because the next task is also a registered task, the metadata information of the next task can be obtained through the task registration module, thereby obtaining the metadata of the next task, for example, the type of task, the requirements on the input data, and the requirements on the output data. Through the task execution sequence of the task execution plan, the dependency relationship between the task and other tasks, and the relationships between the input parameters of the task and the output data of other tasks, may be known. If a dependency relationship with other tasks exists, the execution states of other tasks in the task execution plan of the first plan compilation task may be obtained, and the context information of the execution via the task execution plan tracking, recording, storing, and accessing interface; in this way, the next task can be assembled by, for example, granting a value to data fields, by using the execution states of respective tasks in the task execution plan of the first plan compilation task and the context information of the execution and the metadata information of the next task, thereby initiating the next task.

Embodiments of adjustment of a task execution plan as described with respect to FIG. 2 may, at runtime, dynamically create or modify a task execution plan that immediately takes effect after the creation or modification. The plan compilation task itself comprises a task execution plan that is also a task and may become a part of task execution plan, which may enhance the extensibility of embodiments of adjustment of the task execution plan at runtime, such that it has a capability of constant iteration and optimization. Moreover, it is not necessary to re-modify the design process with a flow-modeling tool by a professional, and thus it is relatively easy to implement.

Figure 6:
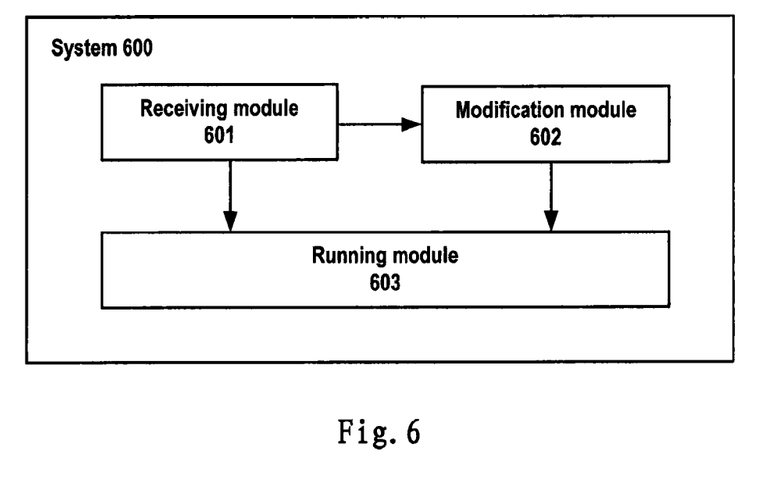
FIG. 6 illustrates a structural block diagram of a system of adjusting a task execution plan at runtime according to a preferred embodiment of the present invention.

Embodiments of systems for adjustment of a task execution plan at runtime may be implemented in a task execution engine that receives a plan compilation task via a plan compilation interface, the plan compilation task comprising a task execution plan. FIG. 6 shows an embodiment of a system 600 for adjustment of a task execution plan at runtime. According to FIG. 6, the system 600 comprises: a receiving module 601 configured to receive a first plan compilation task; a modification module 602 configured to modify the task execution plan in the first plan compilation task in response to receiving a second plan compilation task that comprises a task execution plan modifying the task execution plan in the first plan compilation task; and running module 603 configured to read a next task of the task execution plan in the first plan compilation task and initiate the next task. The task execution plan in the system 600 designates the scopes, execution sequence and context information of all tasks included in the task execution plan. Preferably, the task execution engine comprises a modification interface that activates an editing apparatus for editing a task execution plan of the second plan compilation task in response to a particular operation of a user or external system, the editing apparatus transmitting edited task execution plan of the second plan compilation task to the task execution engine.

In some embodiments, the task execution plan in the second plan compilation task comprises at least one of the following modifications to the task execution plan of the first plan compilation task: (1) adding at least one task to the task execution plan of the first plan compilation task; (2) deleting at least one task from the task execution plan of the first plan compilation task; (3) setting or changing execution sequence of the tasks in the task execution plan of the first plan compilation task; (4) setting or changing parallel execution of the tasks in the task execution plan of the first plan compilation task; and (5) setting or changing context information of a particular task in the task execution plan of the first plan compilation task.

In one embodiment, a state lock control is applied to the task execution plan of the first plan compilation task. At this point, the system 600 further comprises a lock control module configured to lock a reading operation on the task execution plan in the first plan compilation task in response to a necessity of modifying the task execution plan of the first plan compilation task and unlock the reading operation on the task execution plan of the first plan compilation task in response to completion of modifying the task execution plan of the first plan compilation task, wherein the running module performs the reading upon the unlocking the reading operation on the task execution plan of the first plan compilation task.

In another embodiment, the running module further comprises a recording module configured to, after initiating the next task, track and record the execution state of the next task and the context information of the execution, wherein the task execution engine provides the execution states of respective tasks of a current execution plan and the context information of the execution through a task execution plan tracking, recording, storing, and accessing interface.

In a further embodiment, a task execution engine is connected to a task registration module that is configured to store registered tasks, wherein the registered tasks include metadata information of the registered tasks. Preferably, all tasks in task execution plans in the first plan compilation tasks and the second plan compilation tasks are selected from the registered tasks stored in the task registration module.

In one embodiment, the running module comprises a first obtaining module configured to obtain the execution state of the immediately preceding task in the task execution plan of the first plan compilation task and the context information of the execution through a task execution plan tracking, recording, storing, and accessing interface; a second obtaining module configured to obtain metadata information of the next task through the task registration module; and an assembling module configured to assemble the next task using the execution states of respective tasks in the task execution plan of the first plan compilation task and the context information of the execution as obtained by the first obtaining module and the metadata information of the next task as obtained by the second obtaining module to initiate the next task.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one or more other features, integers, blocks, operations, elements, components, and/or groups thereof.

The corresponding structures, materials, acts, and equivalents of all means or block plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method, comprising:
during runtime of a first task execution plan with a first execution sequence, dynamically modifying the first task execution plan by:
receiving a second task execution plan with a second execution sequence and a third task execution plan with a third execution sequence;
modifying the second task execution plan with the third task execution plan and modifying the second execution sequence based on the third execution sequence;
modifying the first task execution plan with the modified second task execution plan and modifying the first execution sequence based on the second execution sequence; and
initiating a task of the modified first task execution plan based on the modified first execution sequence.

2. The method according to claim 1, wherein the first task execution plan designates a scope, the first execution sequence, and context information of a plurality of tasks included in the first task execution plan.

3. The method according to claim 1, wherein the second task execution plan modifies the first task execution plan by at least one of:
adding at least one task to the first task execution plan;
deleting at least one task from the first task execution plan;
setting parallel execution of tasks in the first task execution plan; and
setting context information of the task in the first task execution plan.

4. The method according to claim 1, wherein a state lock is applied to the first task execution plan to control a reading operation for reading the task.

5. The method according to claim 1, further comprising:
tracking and recording an execution state of the initiated task.

6. The method according to claim 5, wherein the tracking and the recording are performed by a task execution engine.

7. The method according to claim 1, wherein the task is a registered task.

8. A computer system comprising:
a memory storing computer readable program code; and
a processor coupled to the memory that executes the computer readable program code to perform:
during runtime of a first task execution plan with a first execution sequence, dynamically modifying the first task execution plan by:
receiving a second task execution plan with a second execution sequence and a third task execution plan with a third execution sequence;
modifying the second task execution plan with the third task execution plan and modifying the second execution sequence based on the third execution sequence;
modifying the first task execution plan with the modified second task execution plan and modifying the first execution sequence based on the second execution sequence; and
initiating a task of the modified first task execution plan based on the modified first execution sequence.

9. A computer system according to claim 8, wherein the first task execution plan designates a scope, the first execution sequence, and context information of a plurality of tasks included in the first task execution plan.

10. The computer system according to claim 8, wherein the second task execution plan modifies the first task execution plan by at least one of:
adding at least one task to the first task execution plan;
deleting at least one task from the first task execution plan;
setting parallel execution of tasks in the first task execution plan; and
setting context information of the task in the first task execution plan.

11. The computer system according to claim 8, wherein a state lock is applied to the first task execution plan to control a reading operation for reading the task.

12. The computer system according to claim 8, wherein the computer readable program code is executed to perform:
tracking and recording an execution state of the initiated task.

13. The computer system according to claim 12, wherein the tracking and the recording are performed by a task execution engine.

14. The computer system according to claim 8, wherein the task is a registered task.

15. A computer program product, the computer program product comprising a non-transitory computer readable storage medium having computer readable program code embodied therewith, the computer readable program code configured to:
during runtime of a first task execution plan with a first execution sequence, dynamically modify the first task execution plan by:
receiving a second task execution plan with a second execution sequence and a third task execution plan with a third execution sequence;
modifying the second task execution plan with the third task execution plan and modifying the second execution sequence based on the third execution sequence;
modifying the first task execution plan with the modified second task execution plan and modifying the first execution sequence based on the second execution sequence; and
initiate a task of the modified first task execution plan based on the modified first execution sequence.

16. The computer program product according to claim 15, wherein the first task execution plan designates a scope, the first execution sequence, and context information of a plurality of tasks included in the first task execution plan.

17. The computer program product according to claim 15, wherein the second task execution plan modifies the first task execution plan by at least one of:
add at least one task to the first task execution plan;
delete at least one task from the first task execution plan;
set parallel execution of tasks in the first task execution plan; and
set context information of the task in the first task execution plan.

18. The computer program product according to claim 15, wherein a state lock is applied to the first task execution plan to control a reading operation for reading the task.

19. The computer program product according to claim 15, further comprising:
tracking and recording an execution state of the initiated task.

20. The computer program product according to claim 19, wherein the tracking and the recording are performed by a task execution engine.

\* \* \* \* \*